United States Patent [19]

Nelson

[11] 4,162,712

[45] Jul. 31, 1979

[54] VEHICLE DIFFERENTIAL CONTROL

[75] Inventor: Carl D. Nelson, Glendale, Ariz.

[73] Assignee: J. I. Case Company, Racine, Wis.

[21] Appl. No.: 890,326

[22] Filed: Mar. 27, 1978

[51] Int. Cl.² ............................................. B60K 17/30
[52] U.S. Cl. ..................................... 180/253; 180/76;
74/711
[58] Field of Search .................... 180/43 R, 76, 82 D;
74/711

[56] References Cited

U.S. PATENT DOCUMENTS

| | | | |
|---|---|---|---|
| 2,884,811 | 5/1959 | Benno | 74/711 |
| 3,138,970 | 6/1964 | Costa | 74/711 |
| 3,288,232 | 11/1966 | Shepherd | 180/82 D |
| 4,042,059 | 8/1977 | Bertolasi | 180/82 R |

Primary Examiner—John P. Silverstrim
Attorney, Agent, or Firm—Arthur J. Hansmann

[57] ABSTRACT

A vehicle differential control wherein the two axles and wheels thereon are influential in controlling the differential. Thus, speed sensors are on the two axles and link mechanisms connect the sensors to a valve unit which controls the flow of fluid to the differential and thus controls the operation of the differential and the subsequent speed of the respective axles. Also, the wheels on the axles are steerable wheels, and there is interconnecting mechanism between the wheels and the differential control mechanism so that when the wheels are steered the control mechanism is actuated to again influence the operation of the differential and thus rotate the respective axles accordingly. As such, there is a steering compensated differential controlled device which is both torque and speed sensed, and there is a wheel steering position compensated device which also influences the operation of the differential. The system is such that it assures traction control of all drive wheels at all times.

4 Claims, 3 Drawing Figures

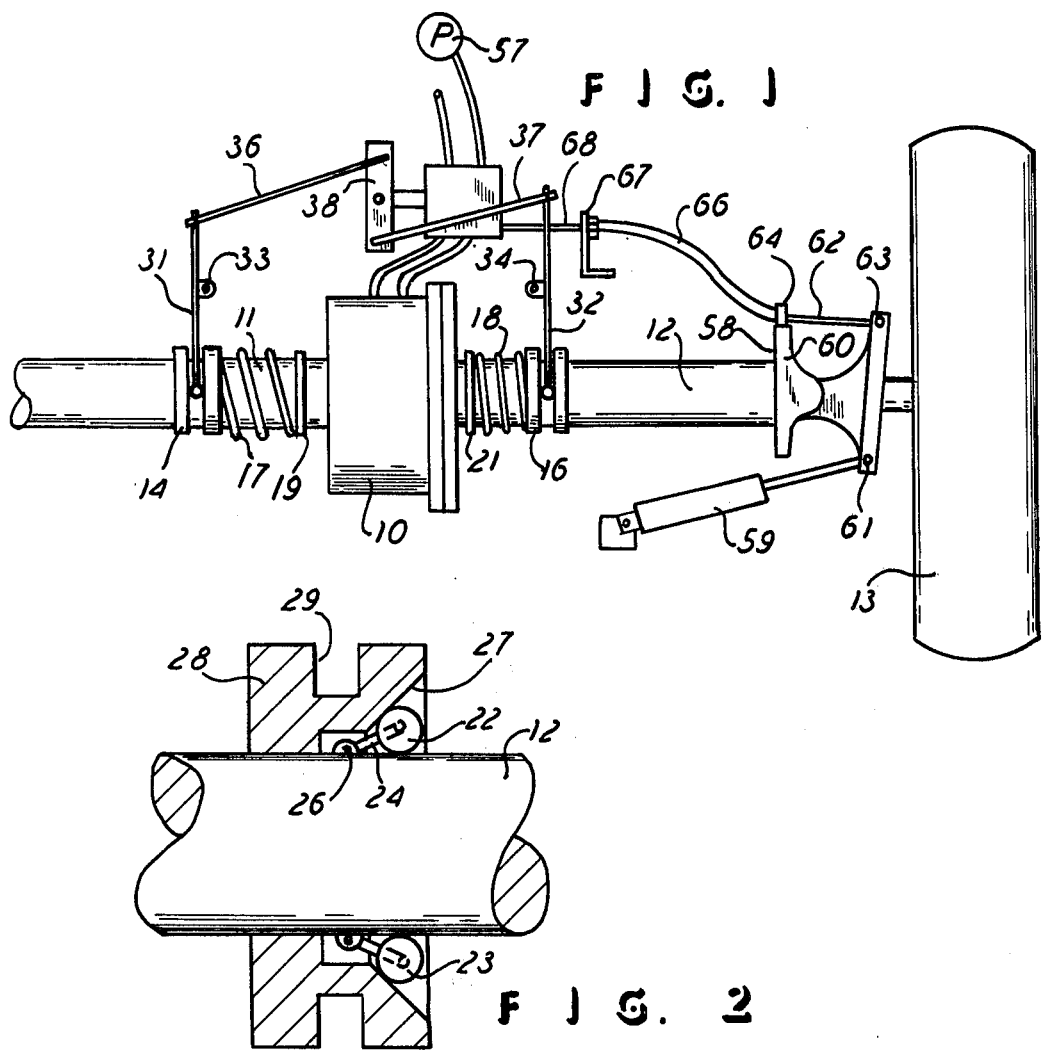
FIG. 1
FIG. 2
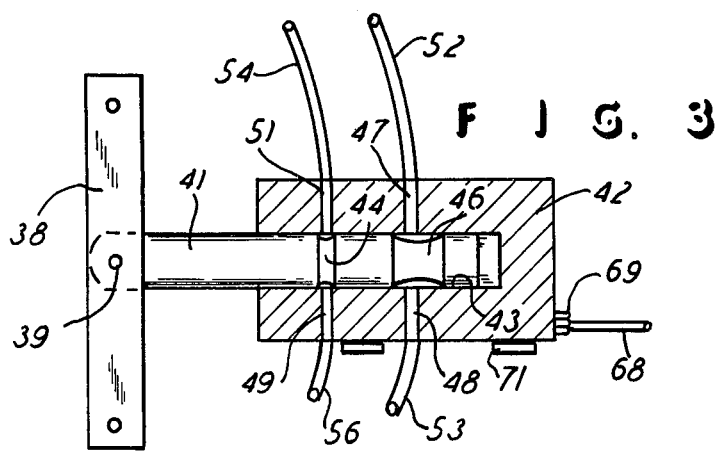
FIG. 3

VEHICLE DIFFERENTIAL CONTROL

This invention relates to a vehicle differential control, and, more particularly, it relates to a mechanism that assures traction control of all vehicle drive wheels at all times and responds to the difference in rotational speeds of the two axles and also responds to the steering of the drive wheels.

BACKGROUND OF THE INVENTION

The prior art is already aware of vehicle drive systems wherein the steering wheels are also the driven wheels and a differential permits the required different rotational speeds of the wheel axles. As such, there is known steering wheel vehicle drive arrangements. The present invention relates to those arrangements but is arranged with a sensing and control system including a steering-compensated traction-control device for the wheels. It is a general object of this invention to provide that type of vehicle system.

More specifically, it is an object of this invention to provide a steering-compensated differential-control device which is torque and/or speed sensed and with a hydraulically or electrically controlled differential lock controlled through a steering-position compensated control device. As such, there is provided a mechanism that assures traction control of all of the vehicle drive wheels at all times.

Another object of this invention is to accomplish the aforementioned and to do so with elements and parts which are not expensive and complicated and which are reliable in their action and which are also adaptable to basic existing differential and drive-axle systems for vehicles.

Other objects and advantages will become apparent on reading the following description in light of the accompanying drawings.

BRIEF DESCRIPTION OF THE DRAWINGS

FIG. 1 is a rear elevational view of the control system of this invention.

FIG. 2 is an enlarged sectional view of the sensor on the right as shown in FIG. 1.

FIG. 3 is an enlarged view of the control mechanism shown in FIG. 1.

DETAILED DESCRIPTION OF THE PREFERRED EMBODIMENT

The drawings show the steering compensated differential control device of this invention which includes a conventional type of differential 10 which is suitably mounted in a vehicle and which has wheel axles 11 and 12 extending from opposite sides thereof to support and rotate a ground wheel on each extending end of the axle 11 and 12, such as the shown ground wheel 13. It will also be noticed that the ground wheel 13 is a steerable wheel as more fully explained hereinafter. Further, since the differential 10 is of a conventional type, it will be understood that it is fluid actuated and responsive and would include the usual locking pistons for the so-called lock-up function or action, all as known and understood by anyone skilled in the art and it therefore need not be further described or shown in this application.

The axles 11 and 12 each have a speed and or torque sensor 14 and 16, respectively, on the axles for sliding movement along the axles and to the right and left as viewed in FIG. 1, and thus in the direction against the compression springs 17 and 18 which are wrapped around the respective axles 11 and 12 and bear against collars 19 and 21, respectively, affixed to the axles 11 and 12, respectively.

FIG. 2 shows that the sensors 14 and 16 are under the influence of fly-balls 22 and 23 which are secured to the respective axles 11 and 12 by means of pivot arms 24 anchored at pins 26 on the respective axles. Thus, the balls 22 and 23 are in the nature of centrifugal weights which move radially outwardly relative to the axles 11 and 12 when the latter are rotating at sufficient speeds for that normal and understandable centrifugal action. The weights 22 and 23 bear against a conical surface or inclined plane 27 on the interior of the sensor rings 28, and thus the sensor rings 28 move along the respective axle 11 and 12, such as to the right and left as shown in FIGS. 1 and 2, and thus against the respective compression springs 17 and 18.

Each of the sensor rings 28 has a groove 29 which receives respective sensing transmittal levers 31 and 32 mounted on fixed pivot pins 33 and 34, respectively. In turn, the levers 31 and 32 are pivotally connected to sensing transmittal rods 36 and 37 which also pivotally connect to a pivot and metering arm 38. With the arrangement described, it will be seen and understood that when the sensor rings 28 shift to the right and left on the respective axles 11 and 12, the levers 31 and 32 are pivoted about their pins 33 and 34 and thus cause displacement of the rods 36 and 37 and cause movement of the arm 38.

FIGS. 1 and 3 show that the arm 38 is pivotally connected by a pin 39 to a valve spool or closure 41 which extends to the interior of a valve housing 42. Thus the housing 42 has a chamber 43 into which the spool 41 extends and presents its two different size grooves 44 and 46 in the chamber 43. Further, the housing 42 has inlet and outlet fluid passageways 47 and 48, in communication with the spool groove 46, and it has inlet and outlet passageways 49 and 51 in flow communication with the spool groove 44, and the FIG. 3 position. Also, fluid lines 52 and 53 connect with the housing passageways 47 and 48, respectively, and fluid lines 54 and 56 connect with housing passageways 51 and 49, respectively.

FIG. 1 further shows that there is a fluid pump 57, such as a hydraulic pump, which supplies pressure into the line 52 and thus to the valve 42, and the line 54 would return to a sump or reservoir, in a conventional hydraulic system arrangement of a power source 57 connected to a power source control 42. It will be further seen in FIG. 1 that the fluid lines 53 and 56 connect with the differential 10 for operating the latter in the usual manner since the differential 10 is of a conventional arrangement, as understood by one skilled in the art, as mentioned above.

With the structure as described to this point, the operation is such that if there is no steering movement of the wheel 13, and if both axles are rotating at the same speed and transmitting the same torque, then if there is any movement of the torque sensors 14 and 16 along the axles 11 and 12, the movement is the same amount and thus the respective connecting levers 31 and 32 and the respective rods 36 and 37 will move equal amounts, the pivot and metering arm 38 will simply pivot about its pivot mounting 39 and there will be no movement of the valve spool or closure 41.

Next, if one of the two wheels 13 is starting to spin or rotate faster than the other, but there is still no steering movement of either of the wheels 13, the differential 10 is of course letting one axle 11 or 12 rotate faster than the other because of the reduced torque required in that condition. In that event, the sensors 14 and 16 will not move an equal amount, and the unequal movement will be conveyed to the respective linkages and thus cause the metering arm 38 to fully displace and thereby displace its mounting pin 39 and consequently displace the spool or closure 41 and thus alter the condition of the valve 42. The arrangement is such that the spool groove 44 will move out of alignment with the passageways 49 and 51 and thus cut off the flow of fluid back to the reservoir and therefore the fluid from the pump 57 will be directed to the conventional piston in the differential 10 by flowing past the spool larger groove 46 and into the line 53 and this therefore causes conventional lock-up or part lock-up of the differential to correct for the wheel spin.

Finally, for the operation of the system when the wheels 13 are being steered, description will first be made of the structure and then of the function thereof. It will be seen that there is steering mechanism 58 interconnected between the axles and the respective wheels 13, and there is a steering cylinder 59 also shown and connected with the mechanism portion 61 which in turn is connected with the conventional steering mechanism yoke 60. A longitudinal member, in the form of a flexible wire or rod 62, is connected with the mechanism portion 61 and the pin 63 and extends through a slide collar 64 and into a casing 66 which is supported on fixed mounting 67. The cable or the like 62 has its end 68 extending to the valve housing 42 and is affixed thereto by means of a nut 69, for instance, as shown in FIG. 3. It will be further seen and understood that the valve housing 42 is movable and is not restrained in any set or fixed position and thus movement of the rod 62 along its length will cause movement to the left and right as viewed in the drawings, of the housing 42.

In operation, when the wheel 13 is being steered, the member or cable 62 is extended or retracted and thus moves the control or valve housing 42 relative to its closure or spool 41 and thus again alters the flow through the control or valve 42. This arrangement therefore allows for more speed or torque to be applied to one axle relative to the other axle. Further, should one wheel start to spin during the steering or turning described, then the sensors 14 and 16 and their connected linkage and the metering arm 38 would function and provide a correct amount of differential lock-up to maintain the correct amount of spin control. There may be slide supports 71 for the valve 42.

What is claimed is:

1. In a vehicle drive system having a differential including a fluid actuated lock-up element, two wheel axles drivingly connected with said differential and extending from opposite sides thereof, a ground wheel steerably connected with the extending end of each of said axles, steering mechanism connected with each of said wheels, and a fluid power source, the improvement comprising means for controlling said lock-up element in response to both the relative rotational speeds of said axles and the steering position of said steering mechanism, said controlling means including: a valve housing movably mounted on said vehicle, a closure means movably mounted in said housing whereby relative movement between said closure means and said housing controls fluid flow between said fluid power source and said lock-up element; first means for moving one of said housing and said closure means in response to a relative rotation between said axles; and second means for moving the other of said housing and said closure means in response to movement of said steering mechanism.

2. The vehicle drive system as claimed in claim 1, wherein said second means comprises a longitudinal member for transmitting force along the length thereof, and said first means includes a lever system.

3. The vehicle drive system as claimed in claim 2, wherein said first means includes an axle rotation speed sensor operatively associated with each of said axles for sensing axle speed and transmitting the effect thereof to said lever system.

4. The vehicle drive system as claimed in claim 1, wherein said first means includes an axle rotation speed sensor operatively associated with each of said axles for sensing axle speed.

* * * * *